(12) United States Patent
Guichard et al.

(10) Patent No.: US 9,537,752 B2
(45) Date of Patent: Jan. 3, 2017

(54) ENCODING INTER-DOMAIN SHARED SERVICE PATHS

(71) Applicant: Cisco Technology, Inc., San Jose, CA (US)

(72) Inventors: James Guichard, New Boston, NH (US); Paul Quinn, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 14/449,601

(22) Filed: Aug. 1, 2014

(65) Prior Publication Data

US 2016/0014016 A1  Jan. 14, 2016

Related U.S. Application Data

(60) Provisional application No. 62/024,041, filed on Jul. 14, 2014.

(51) Int. Cl.
*H04L 12/715* (2013.01)
*H04L 12/911* (2013.01)

(52) U.S. Cl.
CPC ............ *H04L 45/04* (2013.01); *H04L 47/781* (2013.01); *H04L 47/782* (2013.01)

(58) Field of Classification Search
CPC ..................................................... H04L 45/04
USPC ......................................................... 709/226
See application file for complete search history.

(56) References Cited

U.S. PATENT DOCUMENTS

| | | | |
|---|---|---|---|
| 6,728,702 B1 * | 4/2004 | Subramaniam ... | G06F 17/30716 |
| 7,433,320 B2 | 10/2008 | Previdi et al. | |
| 7,461,381 B2 * | 12/2008 | Adams ................. | H04Q 3/0029 |
| | | | 719/316 |
| 7,483,387 B2 | 1/2009 | Guichard et al. | |
| 7,558,261 B2 | 7/2009 | Arregoces et al. | |
| 7,571,470 B2 | 8/2009 | Arregoces et al. | |
| 7,610,375 B2 | 10/2009 | Portolani et al. | |
| 7,643,468 B1 | 1/2010 | Arregoces et al. | |
| 7,657,940 B2 | 2/2010 | Portolani et al. | |
| 7,720,076 B2 * | 5/2010 | Dobbins ............. | H04L 12/1886 |
| | | | 370/395.52 |
| 7,742,477 B1 | 6/2010 | Guichard et al. | |
| 7,843,914 B2 * | 11/2010 | Havemann .............. | H04L 45/00 |
| | | | 370/389 |
| 8,238,338 B2 | 8/2012 | Swallow et al. | |
| 8,311,045 B2 | 11/2012 | Quinn et al. | |

(Continued)

OTHER PUBLICATIONS

Fuller et al., "Classless Inter-Domain Routing (CIDR): an Address Assignment and Aggregation Strategy", RFC 1519, 1993.*

(Continued)

*Primary Examiner* — O. C. Vostal
(74) *Attorney, Agent, or Firm* — Edell, Shapiro & Finnan, LLC

(57) ABSTRACT

Techniques are presented to enable the instantiation of a service chain that is comprised of service functions belonging to one or more administrative domains. A service chain consisting of one or more service functions in one administrative domain is made available to another administrative domain through an advertisement. This enables the building of inter-domain service chains without the need to share between the administrative domains details about the service chains and service functions in the respective administrative domains.

20 Claims, 5 Drawing Sheets

(56) References Cited

U.S. PATENT DOCUMENTS

| | | | |
|---|---|---|---|
| 8,442,043 B2 | 5/2013 | Sharma et al. | |
| 8,713,669 B2 | 4/2014 | Guichard et al. | |
| 8,843,997 B1* | 9/2014 | Hare | H04L 63/0281 |
| | | | 709/200 |
| 9,258,238 B2* | 2/2016 | Bahadur | H04L 47/125 |
| 2002/0196741 A1* | 12/2002 | Jaramillo | H04L 51/18 |
| | | | 370/252 |
| 2003/0139975 A1* | 7/2003 | Perkowski | G06F 17/30879 |
| | | | 705/14.73 |
| 2003/0177388 A1* | 9/2003 | Botz | H04L 63/0807 |
| | | | 726/10 |
| 2005/0114367 A1* | 5/2005 | Serebrennikov | G06F 17/30887 |
| 2006/0092950 A1 | 5/2006 | Arregoces et al. | |
| 2006/0095960 A1 | 5/2006 | Arregoces et al. | |
| 2006/0173985 A1* | 8/2006 | Moore | G06F 17/3089 |
| | | | 709/223 |
| 2008/0177896 A1 | 7/2008 | Quinn et al. | |
| 2008/0198849 A1* | 8/2008 | Guichard | H04L 45/02 |
| | | | 370/392 |
| 2010/0165985 A1 | 7/2010 | Sharma et al. | |
| 2012/0033663 A1 | 2/2012 | Guichard et al. | |
| 2014/0280595 A1* | 9/2014 | Mani | H04L 12/1827 |
| | | | 709/204 |
| 2015/0200838 A1* | 7/2015 | Nadeau | H04L 45/124 |
| | | | 398/58 |
| 2015/0319078 A1* | 11/2015 | Lee | H04L 45/124 |
| | | | 370/392 |
| 2015/0358235 A1* | 12/2015 | Zhang | H04L 45/745 |
| | | | 370/230 |
| 2015/0381420 A1* | 12/2015 | Kompella | H04L 41/0668 |
| | | | 370/222 |

OTHER PUBLICATIONS

Bernard et al., "Interoperability in GI service Chains—The Way Forward", 2003.*
Govindan et al., "An Analysis of Internet Inter-DOmain Topology and Route Stability", 1997.*
Rosen, et al., "BGP/MPLS IP Virtual Private Networks (VPNs)," Network Working Group, RFC 4364, Feb. 2006, pp. 1-47.

* cited by examiner

ENCODING INTER-DOMAIN SHARED SERVICE PATHS

CROSS REFERENCE TO RELATED APPLICATION

This application claims priority to U.S. Provisional Application No. 62/024,041, filed Jul. 14, 2014, the entirety of which is incorporated herein by reference.

TECHNICAL FIELD

The present disclosure relates to networking for service chains/service paths.

BACKGROUND

Service chaining involves the interception of traffic (packets/frames) and steering them through an ordered set of service functions. Traffic is intercepted through the use of a classifier function at a network node for steering through the service functions. Traffic steering the traffic from the classifier through the service functions is performed by use of a service overlay in the network. This service overlay provides a provision for carrying service metadata in addition to the original packet.

The service chain and the corresponding forwarding state is constructed, maintained and distributed by a control-plane (centralized or distributed). Service chain construction involves establishment of a binding between forwarding state and the service chain. This mapping of forwarding-state to the service chain is termed the service path.

DESCRIPTION OF EXAMPLE EMBODIMENTS

Overview

Figure 1:
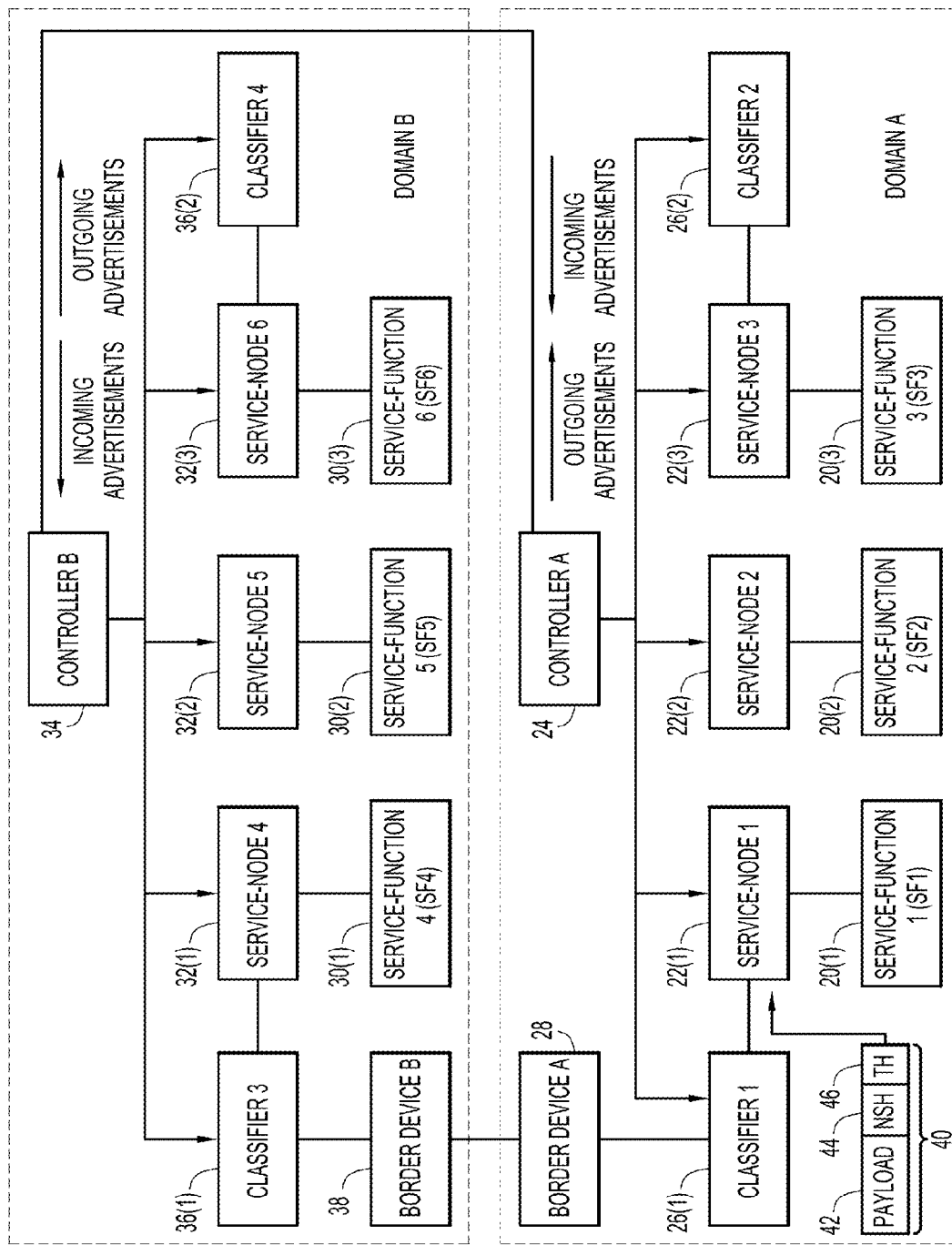
FIG. 1 is a block diagram of an example arrangement of service nodes in a network environment in which inter-domain service chaining of network traffic is enabled, according to an example embodiment.

Presented herein are techniques useful in a network comprising a plurality of network nodes each configured to apply one or more service functions to traffic that passes through the respective network nodes. More specifically, techniques are provided to enable the instantiation of a service chain that is comprised of service functions belonging to one or more administrative domains. A service chain consisting of one or more service functions in one administrative domain is made available to another administrative domain through an advertisement. This enables the building of inter-domain (cross-domain) service chains without the need to share between the administrative domains details about the service chains and service functions in the respective administrative domains.

Example Embodiments

A service chain is defined as a set of service functions, e.g., firewall, network address translation (NAT), deep packet inspection (DPI), intrusion detection service (IDS), and the order in which they should be applied to selective packets as they are forwarded through a service-path. This form of service chaining, while useful, does not provide enough functionality for the delivery of more complex services that rely upon the binding of service policy to granular information such as per-subscriber state, or receipt of metadata specifically formatted for consumption by a particular service function. Examples of metadata specifically formatted for consumption by a service function include application identification, flow identifier and user identity. Such advanced services require that service context and metadata be carried within service headers as part of the data-plane encapsulation.

Service nodes utilize information carried within service headers in the data-plane, such as network classification used for deriving targeted service policies and profiles. Service nodes may also determine common metadata related to a particular service such as finer classification that can be passed to the service functions further down the service-path. In other words, services benefit from metadata derived both from the network as well as the service functions that form a given service chain. Metadata can also be passed between network nodes and be used, for example, to determine forwarding state at the end of a service chain.

The metadata imposed by the network node originating the service chain is a combination of the metadata pushed by a central controller and metadata determined by the network node itself. Controllers push network classification specific metadata to all the network nodes that act as classifiers. These network nodes perform the classification and choose the assigned metadata for that classification along with the forwarding state. The determined metadata could be related to aspects of the service topology such as tenant identity. The implication of associating such metadata to the forwarding state and passing it to the functions that provide services is that more complex services can be delivered, for instance, on a tenant boundary for a given service-path. This can result in simpler services because the services do not need to derive information or re-classify every packet/flow.

A Network Service Header (NSH) is defined to enable service chaining in the data plane. The NSH provides a service overlay that is independent of the transport encapsulation used for traffic steering, and also metadata capabilities that allow services to exchange information.

Current techniques for service chaining are typically restricted to a single administrative domain under the control of a single control-plane entity. However, as the technology matures, the need for service chains that span administrative boundaries and share services amongst them is becoming apparent. For example, cloud service customers will likely offer local services (e.g. firewall in a branch office) and purchase other services from the cloud provider (e.g. advanced security detection).

Presented herein are techniques to enable the instantiation of a service chain that is comprised of service functions belonging to one or more administrative domains.

Service chains are constructed using architectural concepts and principles of topological independence and shared metadata, which are realized by a Network Service Header (NSH) added to encapsulated packets or frames to realize service paths including metadata exchange. Establishment and maintenance of these service chains is dictated by a control-plane and is currently restricted to a single administrative domain. While this restriction satisfies a large number of service requirements, several use cases exists that require service functions from different administrative domains to be used in the construction of a service chain.

Reference is now made to FIG. 1 for a description of an example network environment in which the techniques presented herein may be employed. In the example of FIG. 1, there is shown a network environment 10 where two administrative domains exist, each hosting one or more service functions. For illustration purposes, administrative Domain A hosts service functions 'SF1, SF2, SF3' shown at reference numerals 20(1), 20(2), and 20(3), respectively, on service nodes 1, 2 and 3, respectively, shown at reference numerals 22(1), 22(2), and 22(3). Administrative domain 'B' hosts service functions 'SF4, SF5, SF6' shown at reference numerals 30(1), 30(2) and 30(3), respectively, on service nodes 4, 5, and 6, respectively, shown at reference numerals 32(1), 32(2) and 32(3). Each administrative domain has a controller, denoted Controller A at reference numeral 24 and Controller B at reference numeral 34. The controller in each domain is in communication with classifier network nodes for that domain and with a plurality of service nodes. Specifically, in Domain A there are classifier nodes denoted Classifier 1 at reference numeral 26(1) and Classifier 2 at reference numeral 26(2). In Domain B, there are classifier nodes denoted Classifier 3 at 36(1) and Classifier 4 at 36(2). The service nodes are also called network nodes herein and the classifier nodes are also called head-end nodes.

FIG. 1 also shows an example of a packet 40 that passes through the head-end node 26(1) of Domain A. The packet 40 includes payload 42 that is encapsulated in an NSH 44 and then encapsulated within a transport header (TH) 46. The NSH 44 is metadata added to a packet or frame that is used to create a service plane. The payload 42 and the NSH 44 are then encapsulated in an outer header, the TH 46, for transport. The NSH 44 may be added by a service classification function, i.e., the head-node (in the form of a device or application), that determines which packets require servicing, and correspondingly which service path to follow to apply the appropriate service. The NSH 44 is described further hereinafter.

There is IP connectivity between controller 24 of Domain A and controller 34 of Domain B. The controllers 24 and 34 advertise a set of next-hops through which their respective service chains are reachable, e.g., the next hops being the border nodes of the respective domains. To this end, there is a border node Border Device A at reference numeral 28 in Domain A and Border Device B at reference 38 in Domain B. The border devices may be routers or other suitable network devices/elements. There may be network elements (not shown) between Border Device A and Border Device B.

While FIG. 1 shows two administrative domains, this is only an example. In general, there may be any number (greater than 2) of administrative domains, and the concepts presented herein are applicable to such a scenario.

The owner of administrative Domain A may require that a service be constructed that consists of [SF1, SF2, SF3, SF4, SF5, SF6] but only a sub-set of the required service functions are available within the local Domain A. Construction of the required service chain therefore needs to span both administrative Domain A and Domain B.

To facilitate successful construction of such an inter-domain service chain, the following techniques are provided.

Inter-Domain Service Chain Advertisement

Each administrative domain may independently build one or more service chains and selectively advertise them to external administrative domains indicating the local Service Path identifier (ID) and Service Index allocated to the chain. For example, administrative Domain B might advertise a summarized view of service chain [SF4, SF5, SF6] to administrative Domain A by simply presenting a unique Service Path ID 'X' with a Service Index '3'.

Such advertisements are exchanged between the control-plane entities of each administrative domain. FIG. 1 shows that Controller A may advertise service chains within Domain A to Domain B, and likewise Controller B may advertise service chains within Domain B to Domain A. Thus, the controller entity in each domain is capable of sending outgoing advertisements about service chains within its domain and receiving incoming advertisements about service chains in other domains. Any one of numerous protocols now known or hereinafter developed could be utilized for this purpose.

Figure 2:
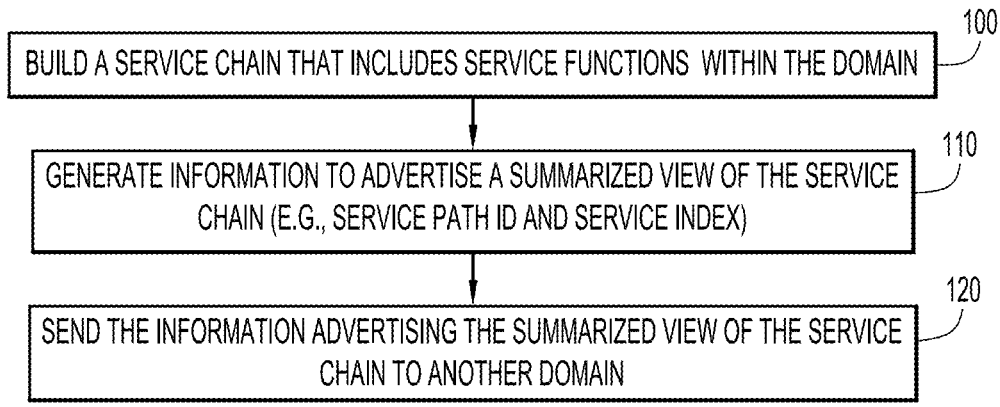
FIG. 2 is a flow chart depicting operations performed in a controller of an administrative domain to advertise a service chain to another administrative domain, according to an example embodiment.

FIG. 2 illustrates a flow chart for operations performed by a controller in a domain for advertising a service chain to another domain. First, at 100, a service chain is built that includes service functions within the domain. Next, at 110, the controller generates information to advertise a summarized view of the service chain (e.g., Service Path ID and Service Index). Then, at 120, the controller sends the information (using any applicable message protocol format) advertising the summarized view of the service chain to the controller(s) of one or more other domains.

Building Inter-Domain Service Chains

Each control-plane entity, subject to policy constraints, within a given administrative domain may use the inter-domain advertisements in the construction of service chains. For example, administrative Domain A may select to use services 'SF4, SF5, SF6' as part of a service chain that originates within Domain A, and known locally only by the Service Path ID 'X', learned from administrative Domain B through received advertisements from Domain B.

Service chains that contain service functions from other (external) administrative domains indicate this by inserting the received Service Path ID within context metadata that is carried within the NSH encapsulation as packets traverse the service chain. Example context settings are provided below.

Figure 3:
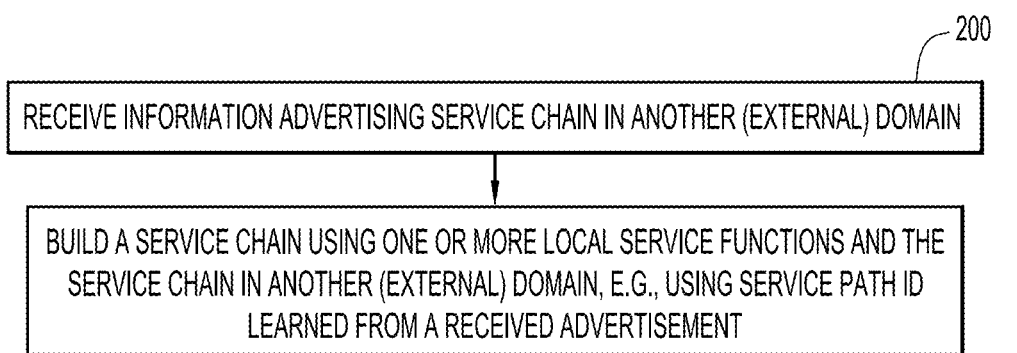
FIG. 3 is a flow chart depicting operations performed in a controller of an administrative domain to build an inter-domain service chain, according to an example embodiment.

Thus, FIG. 3 summarizes the operations performed by a controller in building an inter-domain service chain. At 200, Information is received that advertises a service chain in another (external) domain. Next, at 210, a service chain is built using one or more local service functions and the service chain in another (external) domain, e.g., using a Service Path ID learned from a received advertisement.

A receiving administrative domain of inter-domain service chain traffic is able to forward traffic into local service chains through inspection of received metadata that contains a local Service Path ID that was advertised to the sending administrative domain.

Referring back to the original example, administrative Domain A' may use the above techniques to build the required service chain [SF1, SF2, SF3, SF4, SF5, SF6] by selection of the local service functions and one or more service chains available within an external administrative domain. An example representation of such a service chain is as follows:

Admin Domain A-Service Chain [SF1, SF2, SF3, [Service Path:'X', Domain:'B']]

Operating on Inter-Domain Service Chain Traffic

Figure 4:
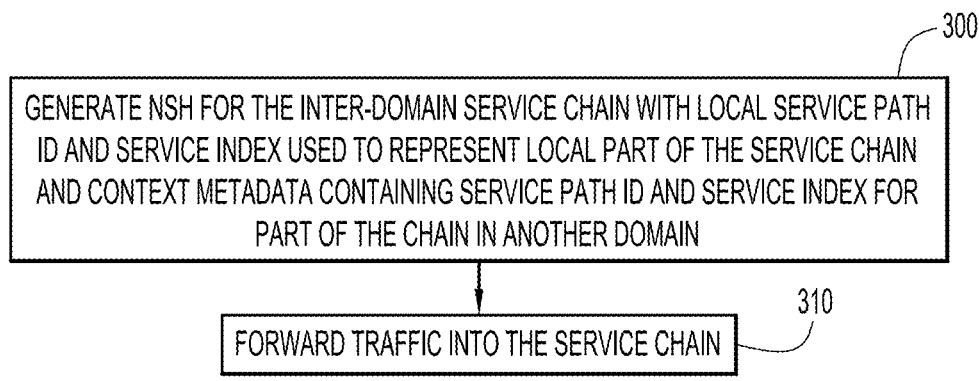
FIG. 4 is a flow chart depicting operations performed to forward inter-domain service chain traffic, according to an example embodiment.

Reference is now made to FIG. 4, with continued reference to FIG. 1. Prior to forwarding traffic into the service chain, at 300, the controller for the domain that is to originate the traffic for the service chain generates an NSH for the inter-domain service domain with a local Service Path ID used to represent local a part of the service chain and context metadata containing Service Path ID and Service Index for part of the chain in another domain. At 310, traffic may then be forwarded into the chain with the NSH headers appropriately set. The NSH encapsulation will contain a local Service Path ID and Service Index that is used to represent the local part of the service chain e.g. [SF1, SF2, SF3] and context metadata will contain the Service Path ID and Service Index that corresponds to the external part of the chain [SF4, SF5, SF6]. In this example, when the traffic hits the service node for SF3, that service node will read the NSH and determine that it is to forward the traffic out of Domain A to Domain B. Border Device B in domain B will receive the traffic and forward it to service node 4 where SF4 is applied to the traffic, then the traffic is directed to service node 5 where SF5 is applied, and so on.

Figure 5:
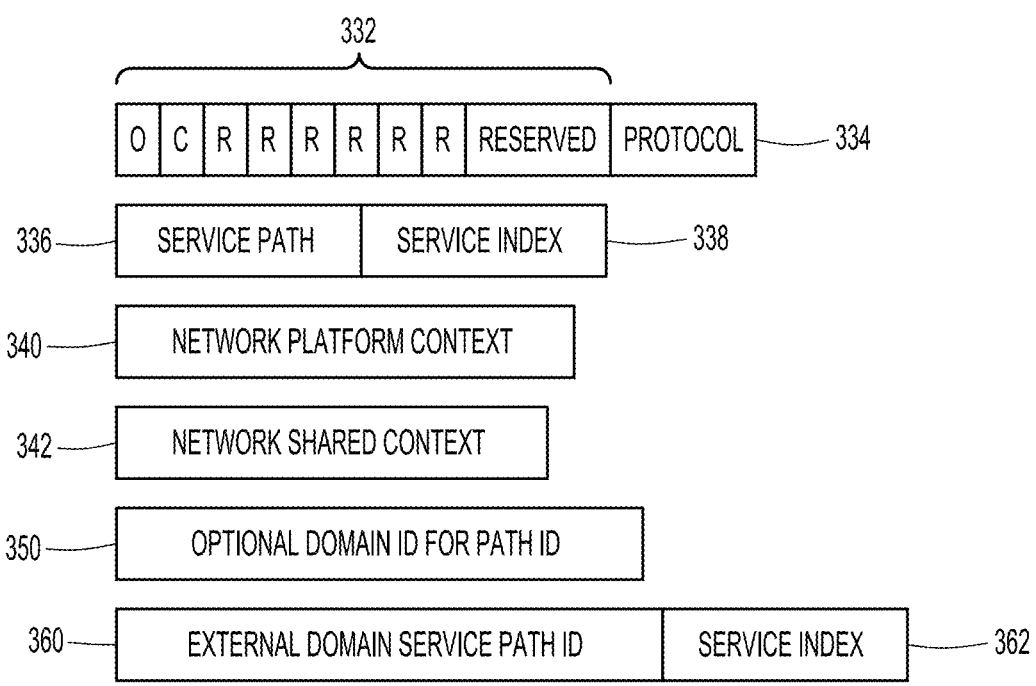
FIG. 5 is a diagram depicting a Network Service Header structure having headers to carrying information indicating inter-domain service chain traffic, according to an example embodiment.

Reference is now made to FIG. 5. FIG. 5 illustrates an example of a NSH 330 that is suitable to perform the inter-domain service chain techniques presented herein. The NSH 330 includes a plurality of headers. The NSH is designed to be easy to implement across a range of devices, both physical and virtual, including hardware forwarding elements.

A base header 332 includes a field that contains certain flags described below and a protocol type field. The "O" bit is a one-bit flag that indicates whether a packet is an operations and management (OAM) packet. Participating nodes examine the payload and take appropriate action (i.e. return status information) when the "O" bit is set. The "C" bit indicates whether context headers are present. When the "C" bit is set, one or more contexts are in use (i.e. a value placed in a context is significant). The "C" bit specifies that the ordering and sizing of the contexts is predetermined. A "C" bit equal to zero indicates that no contexts are in use and that they can be ignored. If a context header is not in use, the value of that context header is zero. The "R" bits are reserved bits.

The Protocol field 334 indicates the protocol type of the original packet or frame.

The Service Path field 336 identifies a particular service path, and thus contains a Service Path Identifier (ID). A participating node uses this identifier for path selection. The Service Index field 338 indicates how many service functions are in the service path for that Service Path ID.

NSH aware nodes, e.g., service classifiers, services nodes and forwarding elements in the service plane, have several possible NSH related actions.

Insert/remove service header: these actions can occur at the start and end respectively of a service path or can be performed by a service function that determines that a service path must change due to local policy. Data is classified, and if determined to require servicing, a service header imposed. A service function can re-classify data as required. A service classifier inserts an NSH. As the end of a service chain, the last node operating on the service header removes it.

Forward based on header fields: the NSH provides service chain information and is used by participating nodes to determine correct service path selection and forwarding as well as loop detection. Participating nodes use the NSH for selecting the next service in the service path.

Update a service header: fields in the base service header are updated by service functions. Context headers may be updated as needed, for example if more granular classification occurs. If a non-service element acts as a data plane proxy (adding and removing the NSH on behalf of the service), then that node updates the base header.

Service Policy Selection: service instances derive policy selection from the service header. Context shared in the service header can provide a range of service-relevant information such as traffic classification. Service functions use the NSH 100 to select local service policy.

Once the metadata is added to a packet, an outer encapsulation is used to forward the original packet and the associated metadata to the start of a service chain. The encapsulation serves two purposes:

1. Creates a topologically independent services plane. Packets are forwarded to the required services without changing the underlying network topology.

2. Non-participating network nodes simply forward the encapsulated packets as is.

The NSH is independent of the encapsulation used and may be encapsulated using any transport scheme now known or hereinafter developed. The presence of the NSH is indicated via protocol type in the outer encapsulation or, in the case of Multi-Protocol Label Switching (MPLS), the presence of the Generic Associate Channel G-Ach Label (GAL).

The NSH may also include one or more context headers, including a Network Platform context header 340, and a Network Shared context header 342. The Network Platform context provides platform-specific metadata shared between network nodes. The Network Shared context header is a network shared context that provides metadata relevant to any network node, such as the result of edge classification.

Important to inter-domain service chaining, the NSH includes a header 350 for an Optional Domain ID for path identification. The Domain ID in the NSH is used to identify the "peered" service provider.

In addition, the there is a header 360 for an External Service Path Domain ID field and a Service Index field 362 in order to identify an external domain and an index for the number of service functions in that external domain. In the example above, Controller A would set the External Service Path Domain ID field 360 to "Domain ID B", and the Service Index field 362 to "3".

The context headers serve several purposes. For example, they pass metadata to the service nodes for interpretation and for deriving service policy/profiles necessary to deliver service corresponding to the service path. In other words, each context header may be interpreted to derive a service profile used for applying a service function at the network node in the service path. In addition, the context headers pass forwarding state to the intermediate network nodes as well as services that participate in realizing the service chain. The context headers may be defined and predetermined by the controller (e.g., Controller A and Controller B as shown in FIG. 1) that is in communication with a plurality of service nodes or they may be determined and agree upon, a priori, among the service nodes. In the latter case, each of the plurality of network service stores information indicating the structure and definitions on which the variable set of context headers are based.

The metadata passed in the context headers is specific to the forwarding state carried and in that sense, different forwarding paths might carry different metadata. The controller is responsible for managing and pushing service chains to the network nodes that act as classifiers. The service chains and the forwarding path used to realize the service chains determine the service forwarding path or service path. The service path thus becomes the forwarding state that all network nodes have to extract from the context stack in determining the next-hop of the service chain. The network nodes can utilize this forwarding state not only to determine the next-hop for the service chain but also to perform additional transformations on the traffic in accordance with metadata for a particular context header in order to support a variety of service instances, i.e., in order to support a particular service function. As an example, the network nodes can replace the incoming transport with a completely different one that is understood by the service while preserving the context stack. The context headers also enable network nodes to act as proxies to the service functions of another network node and perform mapping of metadata to primitive interfaces understood by the services. Thus, when a network node receives a service header, parses the service header to retrieve the one or more stacked context headers, the network node interprets a forwarding state and a next-hop network node for the service path from the service header, and determines a service action or associated metadata from the set of context headers.

Figure 6:
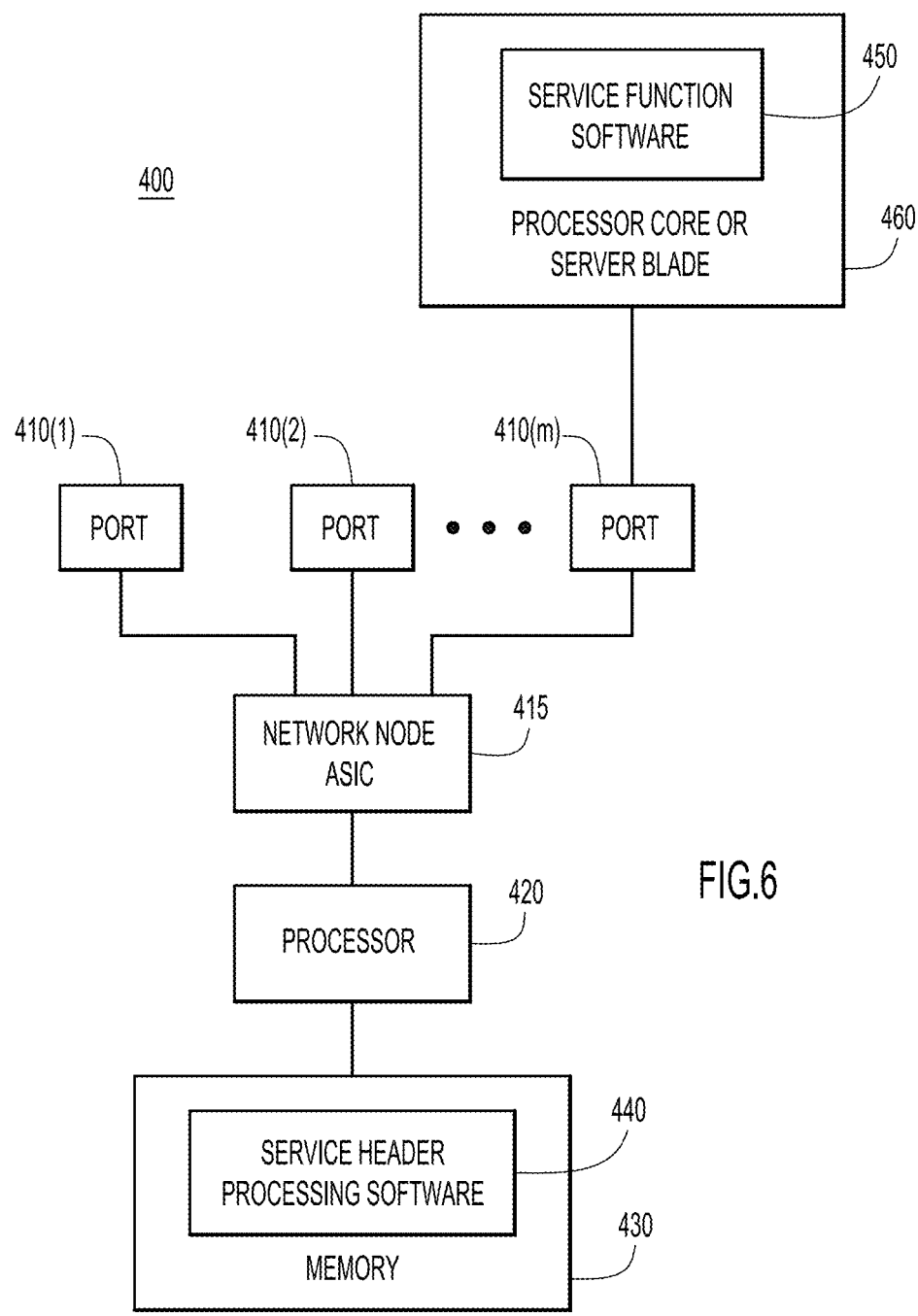
FIG. 6 is an example of a block diagram of a network node, according to an example embodiment.

FIG. 6 illustrates an example block diagram for a network/service node, e.g., a switch, router, gateway, etc., configured to perform the operations described herein for a network node. It should be understood that a virtual network node would be a software-emulated or virtualized version of what is shown in FIG. 6. The network node 400 comprises a plurality of ports 410(1)-410(m), a network Application Specific Integrated Circuit (ASIC) 415, a processor or central processing unit (CPU) 420 and memory 430. The ports 410(1)-410(m) receive ingress packets and output egress packets from the network node. The network node ASIC 420 directs incoming packets to ports for egress according to logic as well as controls from the processor 420. For example, if the network node is a router, then the ASIC 415 is a router ASIC configured for network routing functions, and if the network node is a switch, then the ASIC 415 is a switch ASIC configured for network switch functions. The processor 420 is a microprocessor or microcontroller, for example, and executes instructions for the service header processing firmware/software 440 stored in memory 430. The service header processing firmware/software 440 includes instructions that, when executed by the processor 420, cause the processor to perform the operations described herein for a network node/service node.

The operations of a service function associated with network node 400 are implemented by service function software 450 running on a processor core or server blade 460 that is in communication with a port, e.g., port 410(m), of the network node.

The memory 430 may comprise read only memory (ROM), random access memory (RAM), magnetic disk storage media devices, optical storage media devices, flash memory devices, electrical, optical, or other physical/tangible memory storage devices. In general, the memory 430 may comprise one or more tangible (non-transitory) computer readable storage media (e.g., a memory device) encoded with software comprising computer executable instructions and when the software is executed (by the processor 420) it is operable to perform the operations described herein.

Figure 7:
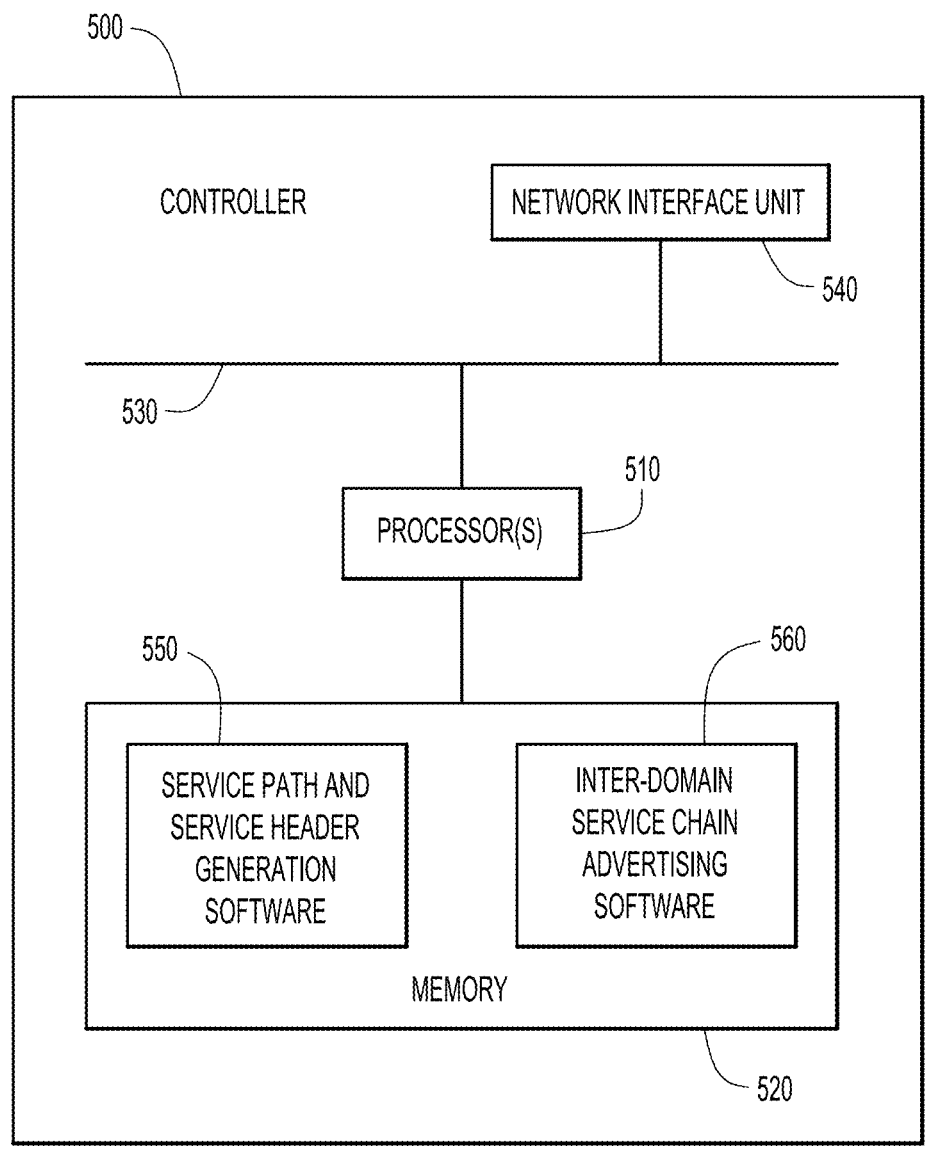
FIG. 7 is an example of a block diagram of a controller that communicates with a plurality of network nodes.

Turning now to FIG. 7, an example block diagram is shown for a controller 500 configured to perform the operations described herein for Controller A and Controller B. It should be understood that a virtual controller would be a software-emulated or virtualized version of what is shown in FIG. 7, such as software running in a data center. The controller 500 includes one or more processors 510, memory 520, a bus 530 and a network interface unit 540. The processor 510 may be a microprocessor or microcontroller. The network interface unit 540 facilitates network communications between the controller 20 and the network nodes. The processor 510 executes instructions associated with software stored in memory 520. Specifically, the processor 510 stores service path and service header generation software 550 that, when executed by the processor 510, causes the processor 510 to perform the operations for the controller described herein with respect to FIGS. 1-5. The software 550 includes the capability to use information obtained from advertisements received from other domains about service chains available in other domains. In addition, the memory includes inter-domain service chain advertising software/logic 560 that, when executed by the processor 510, causes the processor to perform the operations for the controller in generating and sending advertisements about a service chain in a local domain to another domain.

The memory 520 may comprise read only memory (ROM), random access memory (RAM), magnetic disk storage media devices, optical storage media devices, flash memory devices, electrical, optical, or other physical/tangible memory storage devices. In general, the memory 520 may comprise one or more tangible (non-transitory) computer readable storage media (e.g., a memory device) encoded with software comprising computer executable instructions and when the software is executed (by the processor 510) it is operable to perform the operations described herein.

In summary, techniques are presented herein to enable the instantiation of a service chain that is comprised from service functions belonging to one or more administrative domains. These techniques have several advantages. They extend service chains across administrative boundaries. In addition, forwarding between administrative domains is achieved without the need for reclassification of traffic at domain boundaries. Furthermore, NSH-based chaining techniques are provided to avoid the need for different domains to either share the specifics of their service offerings, or perform re-classification at their respective edges in order to impose the correct service headers.

To again summarize, in accordance with one aspect, a method is provided comprising at a controller associated with a first administrative domain, generating data describing a service chain comprising one or more service functions to be performed at one or more network nodes in the first administrative domain; at the controller, generating information that summarizes the service chain in the first administrative domain; and advertising the service chain in the first administrative domain to at least a second administrative domain by sending to a controller associated with the second administrative domain a message containing the information that summarizes the service chain in the first administrative domain.

Further, an apparatus is provided comprising: a network interface unit that sends and receives network communications over a network; a processor coupled to the network interface unit, that: generates data describing a service chain comprising one or more service functions to be performed at one or more network nodes in a first administrative domain; generates information that summarizes the service chain in the first administrative domain; advertises the service chain in the first administrative domain to at least a second administrative domain by causing a message to be sent by the network interface unit over the network to a controller associated with the second administrative domain, the message containing the information that summarizes the service chain in the first administrative domain.

In accordance with another aspect, a method is provided comprising receiving at a controller associated with a second administrative domain a message that advertises a service chain in a first administrative domain, the message containing information that summarizes the service chain in the first administrative domain; and at the controller associated with the second administrative domain, generating data for an inter-domain service chain that uses the service chain in the first administrative domain.

Similarly, an apparatus is provided comprising: a network interface unit that sends and receives network communications over a network; a processor coupled to the network interface unit, that: obtains, on behalf of a second administrative domain, a message received at the network interface unit, the message advertising a service chain in a first administrative domain and containing information that summarizes the service chain in the first administrative domain; generates data for an inter-domain service chain that uses the service chain in the first administrative domain.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
    at a controller associated with a first administrative domain, generating data describing a service chain comprising one or more service functions to be performed at one or more network nodes in the first administrative domain;
    at the controller associated with the first administrative domain, generating information that summarizes the service chain in the first administrative domain, wherein the information that summarizes the service chain comprises a service path identifier that represents a sequence of one or more service functions and a service index field that indicates a number of service functions in the sequence; and
    advertising the service chain in the first administrative domain to at least a second administrative domain by sending to a controller associated with the second administrative domain a message indicating the service path identifier and the service index field allocated to the service chain in the first administrative domain.

2. The method of claim 1, further comprising:
    receiving the message at a controller associated with the second administrative domain; and
    at the controller associated with the second administrative domain, generating data for an inter-domain service chain using the service path identifier and index field obtained from the message received from the controller associated with the first administrative domain.

3. The method of claim 2, wherein generating data for the inter-domain service chain comprises using the service path identifier and index field obtained from the message received from the controller associated with the first administrative domain.

4. The method of claim 3, wherein generating data for the inter-domain service chain comprises including identifiers of one or more service functions at one or more network nodes in the second administrative domain.

5. The method of claim 3, further comprising: generating a service header that includes a service path identifier and an index field to represent a local part of the inter-domain service chain that is in the second administrative domain and the service path identifier and the index field to represent a part of the inter-domain service chain that is in the first administrative domain.

6. The method of claim 5, further comprising encapsulating packets associated with the inter-domain service chain with the service header.

7. The method of claim 6, further comprising forwarding packets for the inter-domain service chain.

8. The method of claim 1, further comprising:
    at the controller associated with at least the second administrative domain:
        receiving the message from the controller associated with the first administrative domain indicating the service path identifier and the service index field allocated to the service chain in the first administrative domain; and
        generating a service header based at least on the service path identifier and index field obtained from the message.

9. The method of claim 8, further comprising: generating data for an inter-domain service chain that uses the service path identifier and the service index field allocated to the service chain in the first administrative domain.

10. The apparatus of claim 9, further comprising: encapsulating packets associated with the inter-domain service chain with the service header.

11. The apparatus of claim 10, wherein the processor further encapsulates packets associated with the inter-domain service chain with the service header.

12. A method comprising:
    receiving at a controller associated with a second administrative domain a message that advertises a service chain in a first administrative domain, the message containing information that summarizes the service chain in the first administrative domain, wherein the information that summarizes the service chain comprises a service path identifier that represents a sequence of one or more service functions and an index field that indicates a number of service functions in the sequence; and
    at the controller associated with the second administrative domain, generating data for an inter-domain service chain that uses the service chain in the first administrative domain.

13. The method of claim 12, wherein generating data to build the inter-domain service chain comprises using the service path identifier and index field obtained from the message.

14. The method of claim 12, further comprising:
generating a service header that includes a service path identifier and an index field to represent a local part of the inter-domain service chain that is in the second administrative domain and the service path identifier and the index field to represent a part of the inter-domain service chain that is in the first administrative domain; and
encapsulating packets associated with the inter-domain service chain with the service header.

15. The method of claim 14, further comprising forwarding packets for the inter-domain service chain.

16. An apparatus comprising:
a network interface unit that sends and receives network communications over a network; and
a processor coupled to the network interface unit, that:
generates data describing a service chain comprising one or more service functions to be performed at one or more network nodes in a first administrative domain;
generates information that summarizes the service chain in the first administrative domain, wherein the information that summarizes the service chain comprises a service path identifier that represents a sequence of one or more service functions and a service index field that indicates a number of service functions in the sequence; and
advertises the service chain in the first administrative domain to at least a second administrative domain by causing a message to be sent by the network interface unit over the network to a controller associated with the second administrative domain, the message indicating the service path identifier and the service index field allocated to the service chain in the first administrative domain.

17. An apparatus comprising:
a network interface unit that sends and receives network communications over a network; and
a processor coupled to the network interface unit, that:
obtains, on behalf of a second administrative domain, a message received at the network interface unit, the message advertising a service chain in a first administrative domain and containing information that summarizes the service chain in the first administrative domain, wherein the information that summarizes the service chain comprises a service path identifier that represents a sequence of one or more service functions and a service index field that indicates a number of service functions in the sequence allocated to the service chain in the first administrative domain; and
generates data for an inter-domain service chain using the service path identifier and index field obtained from the message received from the controller associated with the first administrative domain.

18. The apparatus of claim 17, wherein the processor:
generates a service header that includes a service path identifier and an index field to represent a local part of the inter-domain service chain that is in the second administrative domain and the service path identifier and the index field to represent a part of the inter-domain service chain that is in the first administrative domain; and
encapsulates packets associated with the inter-domain service chain with the service header.

19. The apparatus of claim 17, wherein the processor causes packets to be forwarded for the inter-domain service chain.

20. The apparatus of claim 17, wherein the processor further generates a service header based at least on the service path identifier and index field obtained from the message received from the controller associated with the first administrative domain.

* * * * *